KURT E. APPERT
INVENTOR.
BY Lippincott & Smith
ATTORNEYS

Feb. 7, 1956 K. E. APPERT 2,734,172

PILOT REGULATOR FOR COMMUNICATION CIRCUITS

Filed Feb. 4, 1952 4 Sheets-Sheet 2

KURT E. APPERT
INVENTOR.

BY Lippincott & Smith
ATTORNEYS

Feb. 7, 1956 K. E. APPERT 2,734,172

PILOT REGULATOR FOR COMMUNICATION CIRCUITS

Filed Feb. 4, 1952 4 Sheets-Sheet 3

KURT E. APPERT
INVENTOR.

BY Lippincott & Smith
ATTORNEYS

PILOT REGULATOR FOR COMMUNICATION CIRCUITS

Filed Feb. 4, 1952

4 Sheets-Sheet 4

KURT E. APPERT
INVENTOR.

BY Lippincott & Smith
ATTORNEYS 2,734,172
Patented Feb. 7, 1956

2,734,172

PILOT REGULATOR FOR COMMUNICATION CIRCUITS

Kurt E. Appert, Atherton Heights, Calif., assignor to Lenkurt Electric Co., Inc., San Carlos, Calif., a corporation of Delaware Application February 4, 1952, Serial No. 269,806
7 Claims. (Cl. 333—16)

This invention relates to pilot regulators for use on communication circuits carrying a plurality of channels for the purpose of maintaining the level of a received signal substantially constant, irrespective of weather conditions or other variable factors which change the attenuation of the transmitted signals. The regulator of this invention is particularly applicable to use on military circuits which are especially susceptible to changes in their transmission constants with changes of weather and to operation under widely differing circuit conditions. Since, however, the invention is capable of use under these most rigorous conditions and will, under such conditions maintain the overall transmission equivalent of the circuits with which it is employed substantially constant, it is equally usable on circuits having more favorable characteristics to give a higher degree of operating performance than would be obtainable with more conventional equipment.

Pilot regulators have been known for many years. Their use involves the transmission, together with the message signals for which the circuit is established, of a pilot signal of substantially constant frequency. Equipment of this character is usually employed on carrier frequency circuits; where so employed it is the customary practice to select the pilot frequency at the top frequency of the spectrum utilized by the system and to transmit it at a level materially below that of the message signal frequencies, usually 10 to 16 db below the normal message signal level. At the receiving end of the system the pilot signal is filtered out from the frequencies with which it was mixed in transmission, usually is demodulated and the detected signal is employed to control a variable gain or loss device in such sense as to make its output substantially constant.

The reason for choosing the top frequency of the transmitted band as that of the pilot is that in substantially all practical communication circuits the transmission constant of the circuit varies with frequency and in such manner that the greatest loss occurs at the highest frequency. Correction of this frequency will therefore be ample at all frequencies. Furthermore, the higher the frequency the greater the effect of weather change upon the transmission constants of the line. The difference in rate-of-change of transmission constants with weather at different frequencies is termed "twist." Under some conditions it can be neglected and a single correction applied to all the frequencies carried by the channel. Where the twist is large, however, provision must be made for its correction if the regulator is to give the desired results.

In transmission circuits carried in shielded cable the principal factor varying the transmission constant is temperature. The temperature variations in some parts of the United States may run from well below zero Fahrenheit to as much as 120° above. On long lines change in resistance resulting from such changes in temperature can make enormous differences in the level of the received signal. In open wire lines, and, more particularly, in military communications lines, the largest factor affecting the transmission-constant is usually the change from wet to dry, with a consequent change in effective capacity between the leads of the circuit leading to higher attenuation when the line is wet, particularly on the higher frequencies.

Military communication circuits, particularly for field use, offer the worst possible example of transmission-constant changes in the weather. Increased technical requirements for the movement of armies are requiring ever-increasing communication facilities. Under field conditions the practical way of providing circuits is through the use of field wire comprising a twisted pair of conductors. These conductors may be laid on the ground, strung on trees, carried on pike poles, or even run under water. The twisted construction and the consequent tendency of water to gather between conductors when wet makes their change in effective capacity per unit length very large as compared to the minimum capacity which they exhibit under dry conditions. This, in turn, accentuates the difference in attenuation between high and low frequencies; i. e., increases twist, making it a very material factor even within the range of a single voice channel. If field wire circuits are to be extended more than two or three miles twist correction becomes increasingly necessary, for without such correction the highly attenuated signals become unintelligible even if amplified. Modern military practice makes reasonably good communication circuits beyond the two or three mile limit imperative.

One form of pilot regulator which has been employed in the past comprises essentially a bridge circuit wherein the incoming signal is applied across one diagonal of the bridge, the output circuit forming the other diagonal. One arm of the bridge includes a resistive element having a high temperature coefficient of resistance. The arms of the bridge are so proportioned that it is always unbalanced to some degree, the level of the signal appearing in the opposite diagonal varying with respect to the input level in accordance with the degree of unbalance. The pilot signal is selected from the mixed signals in the output, amplified, and the resultant is used to control the temperature of the resistance element in such sense as to maintain the level substantially constant by varying the degree of unbalance of the bridge. As is the case in any negative feedback circuit, the constancy of the output level cannot be absolute, but by using the high degree of amplification in the pilot signal as fed back to control the temperature of the thermo-sensitive element constancy may be approached as closely as may be required.

If all frequencies to be transmitted were equally affected by changes in line constants the arrangement described could handle almost any variation in incoming signal level with available temperature-sensitive resistors, for in that case the temperature-sensitive element could be the sole impedance in the variable arm of the bridge. Where high degrees of twist have to be compensated, however, this is not possible, since elements must be included in the bridge circuit which are frequency selective. It is not feasible to make these elements temperature-responsive in the same way that a resistor may be. In a conventional bridge circuit the frequency selective elements comprising the twist correction circuit would normally present an impedance effectively in series with the temperature-responsive element, with the result that the overall impedance of the bridge arm could not be varied over as wide a range as would be desired if the equally-desired specifications for twist correction are to be met. Furthermore the problem of balancing twist and pilot level compensation over wide ranges of both becomes very complex. The principal objects of the present invention are to provide a pilot regulator wherein a wide range of level correction is combined with a wide range of twist correction, to provide a pilot regulator wherein the twist correction is substantially accurate throughout the range of frequencies handled; to provide a regulator which may be applied, substantially without change, to varying lengths of line and which will still maintain regulation within the desired tolerances; to provide a regulator which will maintain its desired degree of accuracy not only at the limits of its regulating range but for intermediate conditions; e. g., when various portions of the line are subjected to different conditions; and, to provide a regulator having the above enumerated advantages and properties while still maintaining the essential simplicity and reliability of the bridge type, temperature-controlled regulator described above.

Considered broadly the regulator of the present invention employs two elements, the impedance whereof may be automatically varied in response to the amplitude of the pilot frequency. Most conveniently these are temperature-sensitive resistance elements similar to those in the simple type of regular above described. Their temperature coefficients may be either positive or negative; they may be metal filament incandescent lamps, for example, or they may be thermistors, to name only two of several possible types. Preferably, but not necessarily, they are identical. The first of these elements is so connected in one arm of a bridge circuit, together with a frequency-selective network, that at the pilot frequency the impedance of that bridge-arm is determined primarily by that of the variable-impedance element, while at frequencies within the transmitted band remote from the pilot frequency the impedance of the variable impedance element has so little effect on the impedance of the arm as a whole as to have almost no effect on the balance of the bridge, the other arms of which have substantially constant impedance ratios. The input to the regulator connects across the other arm. The second variable-impedance element is so connected in this output circuit as to vary the amplitude of the signal delivered thereby, in response to changes in its impedance.

Means are provided to vary the impedance of both variable elements simultaneously in response to variations of pilot-frequency amplitude in the output circuit, in such sense as to increase the degree of balance of the bridge at the pilot-frequency and decrease the power delivered by the output circuit at all frequencies with increase in pilot-frequency amplitude. With temperature-sensitive elements such means conveniently comprise a filter connected to the output circuit for selecting the pilot frequency, feeding an amplifier which in turn supplies means for thermally biasing the temperature-sensitive elements in such direction as to secure the desired results.

This arrangement enormously increases the range of simultaneous amplitude and twist control illustratively, where tungsten filament control lamps are used, biased by a D.-C. component, a working range of resistance variation between about 200 ohms and about 1500 ohms can be achieved. Using two of these in combination, as has just been described, a pilot level correction of over 22, of which over half is twist has been achieved without approaching the limits of the capabilities of the combination, to give an overall constancy of output level of better than plus-or-minus 1 db for all frequencies between 400 cycles and 3 kilocycles and for all intermediate conditions between extremes.

Referring to the drawings, explanatory of the detailed description of the preferred form of the invention which follows.

For purposes of illustration the invention will be described as it applies to a single-channel circuit designed to operate over a military line of twisted-pair field wire carrying a single, voice frequency channel. Such a circuit is fundamentally poor, being devised for simplicity and ease of construction under field conditions rather than for the quality of transmission thereover. A circuit of this type offers as severe requirements as are likely to be met under any circumstances and it is to be realized that the same principles can be applied to higher quality circuits carrying a much wider frequency band over much longer distances.

Figure 1:
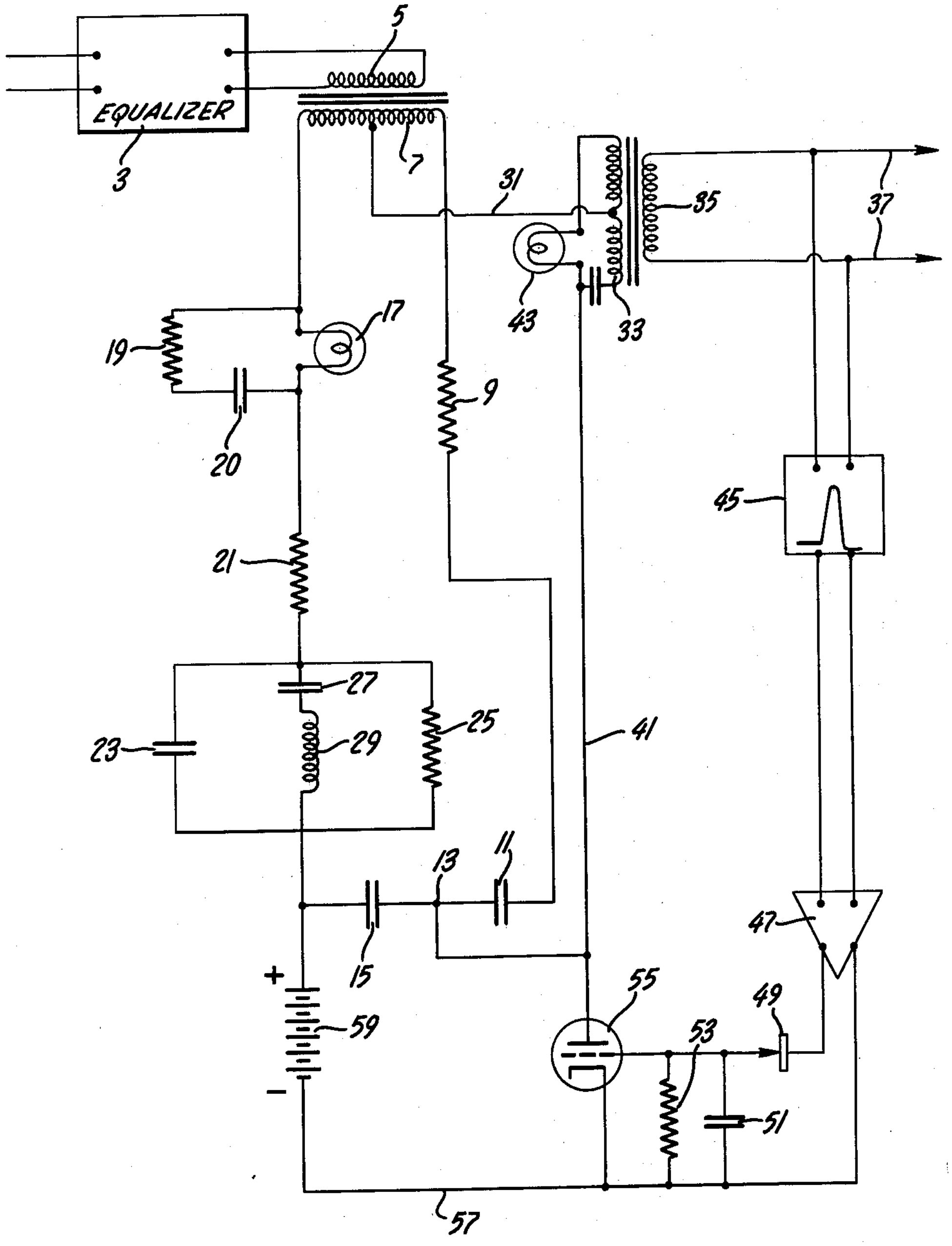
Fig. 1 is a schematic diagram of an embodiment of the invention as designed for the control of the line of army field wire up to 15 miles in length over a band of frequencies covering the voice frequency range up to 3000 cycles.
Figure 2:
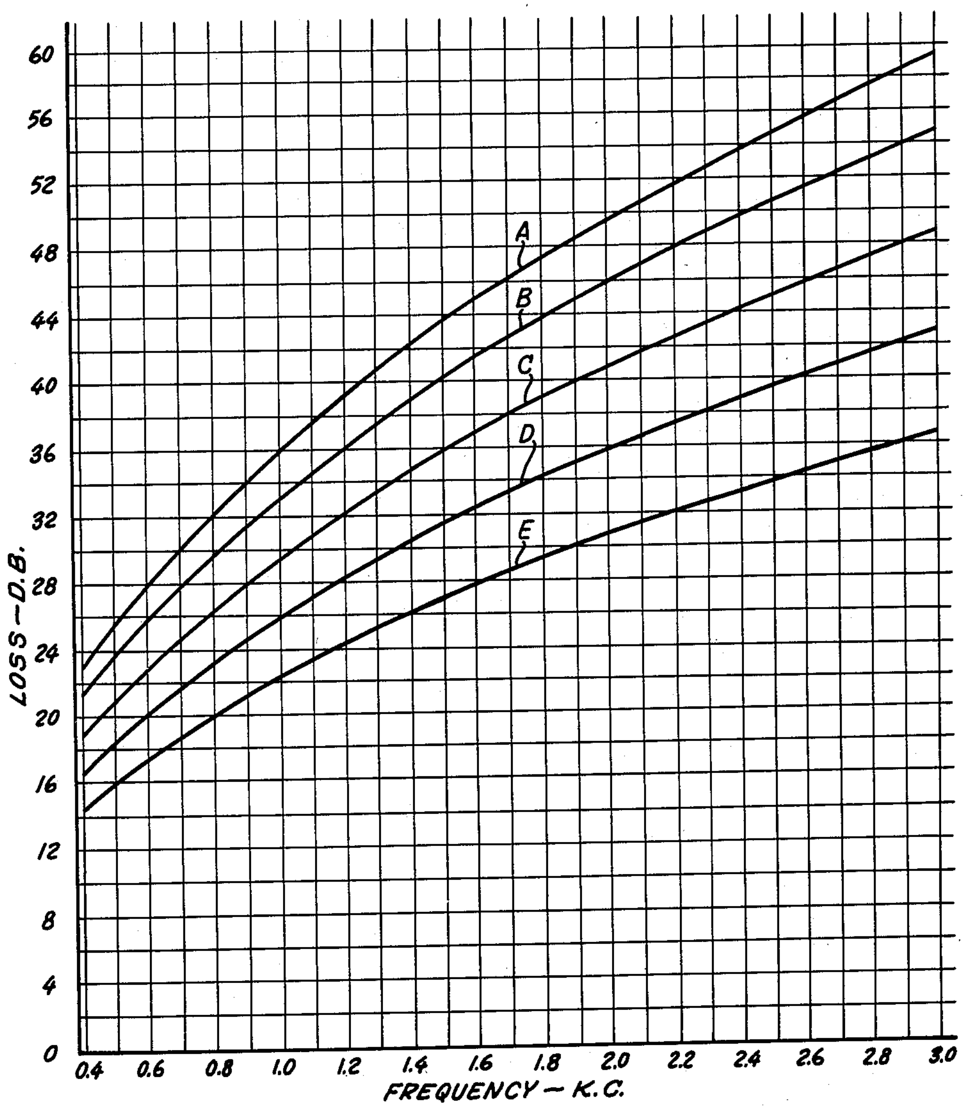
Fig. 2 is a series of graphs showing the loss in db over a 15-mile length of such line when completely wet, completely dry, and various intermediate conditions.

What is shown in the diagram of Fig. 1 is the regulator circuit only. It is shown as connected to an incoming line 1 which has transmission characteristics such as are illustrated in Fig. 2. Furthermore, it is assumed that the equalizer network 3 is such that at the equalizer output the attenuation of all frequencies is the same under the worst transmission conditions, namely, where the losses in the line are as shown in curve A of Fig. 2, corresponding to a line of maximum length (in this case 15 miles) with all of the line wetted.

Figure 3:
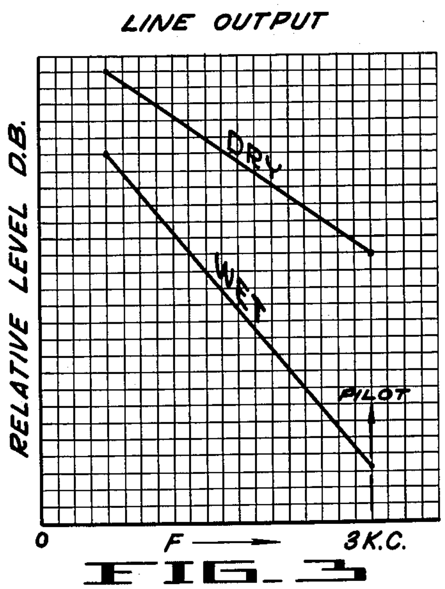
Fig. 3 is an idealized diagram showing the levels of received signals over dry and wet lines.
Figure 4:
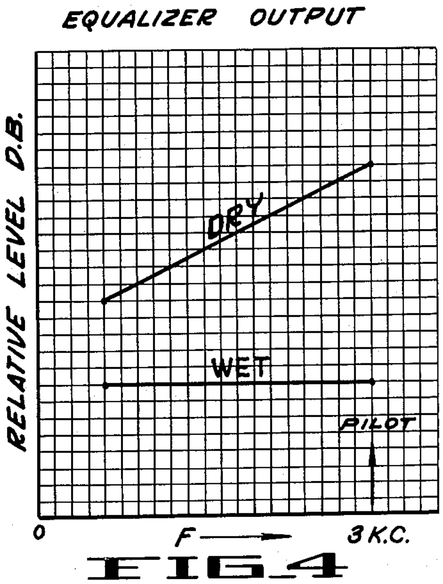
Fig. 4 is a similar idealized diagram illustrating the comparative levels of the received signals under the two conditions shown in Fig. 3, at the output of an equalizing network designed to correct the slope of the lower curve of Fig. 3.

The losses introduced by the equalizing network at the various frequencies will, of course, always be the same irrespective of the condition of the line. Since, considering the line alone, its loss is about 59.5 db at 3 kilocycles and only 23 db at 400 cycles, the equalizer net must introduce a loss at the lower of these two frequencies equal to the difference in the line loss, or 26.5 db more at 400 cycles than at 300, the loss at intermediate frequencies having intermediate values so as to make the output level substantially a constant. Under dry conditions, the same losses will be introduced. As shown by curve E of Fig. 2, the difference in line loss over the frequency band is then only 22.6 db, or the difference between 36.8 db at 3 kilocycles and 14.2 db at 400 cycles. Fig. 3 shows the relative signal levels under the two conditions at the input of the line equalizer, the curves in this figure being idealized to show them as straight lines instead of giving their actual curvature, the functioning of the various elements of the equipment being more readily appreciated with this simplification. Since a regulator of the type here considered can only perform its function by introducing losses, the norm to which all signals are reduced must be the signal showing maximum loss; i. e., the highest frequency as transmitted by a wet line. Hence the equalizer operates on the received signal so that the output under the two conditions is as shown in Fig. 4; under wet line conditions the curve is a straight line of constant ordinate but under dry conditions the received signal is not only higher in level than with the line wet but the level rises with frequency so that the disparity between the two signals is greatest at the pilot frequency at the top of the transmission band.

Reverting to Fig. 1 the equalizer network feeds the primary 5 of a hybrid coil having the usual center tapped secondary winding 7. This secondary forms two arms of a bridge circuit. The use of hybrid coils as an equivalent of the fundamental bridge circuit is believed to be too well understood to require any elaboration; effectively the two halves of the secondary or output coil of the transformer form equal, inductive, arms, and the input potential can be considered as being applied across the ends of the secondary as the input diagonal of the bridge.

In the present case one of the two remaining arms of the bridge is formed by a fixed resistor 9. In this instance, with the hybrid coil of standard type intended to feed out of a 600-ohm line into a similar impedance, the value of the resistor 9 for the specific purpose of the equalizer here described would be approximately 300 ohms. This resistor connects through a blocking condenser 11, which is sufficiently large so that its impedance may be neglected at any frequency within the band operated upon by the system, to a junction point 13 to which the output diagonal of the bridge is connected.

The remaining arm of the bridge, including both level variable and frequency-variable impedence elements, connects to this same junction through a second blocking condenser 15, similar to condenser 11, and to the other terminal of the transformer secondary 7. The elements in the variable are those adapted to correct the particular line here described and many combinations of impedance elements would serve the purpose, either for this particular type of line or, a fortiori, for lines having different characteristics. The wide range of control offered by the present invention is such that it is possible to place upon the bridge circuit substantially the sole duty of correcting the twist, the level correction being placed upon the circuit which loads the bridge. This simplifies the problems of design and it is true only in a manner of speaking, since the twist correction itself involves a small correction in level even at the frequencies remote from the pilot. The bridge is designed to reduce the high frequency, dry-line-level signals only to the level of the dry-line low-frequency signals, leaving the latter nearly unaffected, but to the extent these lower frequencies are affected the change in level is in the right direction.

Figure 5:
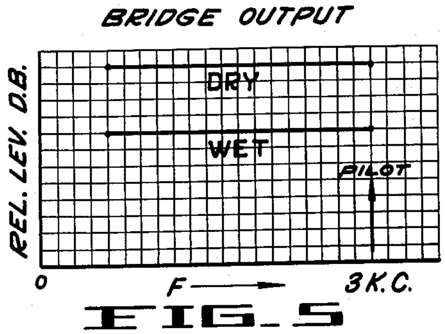
Fig. 5 is an idealized diagram showing the relative output of the bridge portion of the circuit under the two conditions mentioned.
Figure 6:
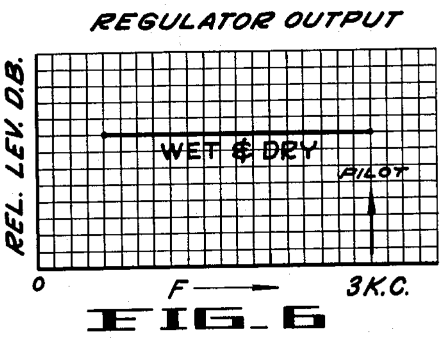
Fig. 6 is a similar diagram illustrating the final regulator output under the same two conditions.

The remaining correction in level is taken care of by the load variation. This is shown in the idealized curves of Fig. 5; the curves representing the signals as they appear at the output diagonal of the bridge should both be straight, horizontal lines, but their level, represented by their ordinates, will not be the same.

In the present case the variable arm comprises a tungsten-filament lamp 17, the filament of which has a cold resistance of approximately 200 ohms and a hot resistance, at the limit of safe operation, of approximately 1500 ohms. This if bridged by a large blocking condenser 20, having negligible impedance in all parts of the transmission band, which isolates resistor 19 with respect to a D. C. resistor 19 of approximately 300 ohms. Both lamp and resistor are in series with a resistor 21 of 200 ohms. Resistor 21 connects in series with a parallel network comprising a condenser 23 of approximately 1 microfarad, shunted by a resistor 25, also of about 200 ohms value, and a series resonant circuit comprising a condenser 27 of approximately ⅔ microfarad and a 2.5 millihenry inductor 27. The characteristics of this circuit are that for frequencies in the neighborhood of the pilot the frequency selective network has a negligible impedance and therefore at this end of the frequency spectrum the balance of the bridge is affected almost entirely by the purely resistive elements 17, 19, and 21. At lower frequencies the impedance of the frequency selective network becomes higher and unbalances the bridge to so great an extent that the variation of the resistance 17 is of only minor effect.

The output diagonal of the bridge may be traced from the center tap of the winding 7 through a lead 31 to a load, in this case an impedance matching transformer having a primary winding 33. The secondary of this transformer is a coil 35 which feeds the output circuit. In the present instance the coil 33 is tapped and only a portion is used as the primary of the transformer, the lead 31 connecting to the tap. The end of the coil 33 connects through a large blocking condenser 39 back through a lead 41 to the junction 13, terminating the diagonal. A second thermo-sensitive resistance element, i. e., a lamp 43, is effectively connected across the primary 33 as a load. As it is desirable, for maintenance reasons, to have the two lamps identical, lamp 43 is connected across the entire winding 33. This winding may then be considered as an auto-transformer feeding the lamp, and by adjusting the ratio of the secondary, comprising the entire winding, to the primary comprising the lower portion only, or by reversing this arrangement, a lamp of any resistance can be used to provide almost any desired load ratio.

The regulating effect is obtained by passing a D.-C. biasing current through the filaments of the two lamps 17 and 43. To obtain the biasing current the pilot frequency is selected from the mixed frequencies in the output circuit 37 by means of a narrow-band filter 45 bridged across the output circuit. The output of filter 45, comprising the pilot frequency only, is fed into an amplifier 47, having high gain characteristics, and the amplified pilot frequency is then supplied to a rectifying network, which may be of any of the well-known types but is symbolized by a rectifier 49 connected in series with an integrating network comprising a condenser 51 shunted by a resistor 53. The cathode-grid circuit of a tube 55 (in this case a triode) is connected across the integrating network and the rectifier 49 is so poled that the charge collected on the condenser 51 tends to bias the grid of tube 55 negatively, thereby cutting down the current in the cathode-anode circuit of the tube. The anode of tube 55 connects to lead 41. The cathode connects through a lead 57 to a source of plate voltage, symbolized as a battery 59, the negative end of which is connected to the cathode of tube 55 and the positive end to the twist-correcting network. The anode circuit of tube 55 can then be traced from the anode, through the filament of lamp 43 and ½ of coil 33, thence through lead 31 to the center tap of the transformer secondary 7. From the end of this coil the circuit continues through the filament of lamp 17, resistors 21 and 25, the battery 59 and thence back to the cathode of tube 55. All other paths are blocked by condensers, i. e., blocking condensers 11, 15, 20 and 38.

As has been stated, the lamps actually used in this circuit have a cold resistance of about 200 ohms and a maximum usable hot resistance of about 1500 ohms. Hence the available working range of the parallel combination of the lamp 17 and the resistor bridging it varies between about 120 ohms and 400 ohms. This is in series with the resistor 21, of 200 ohms, and the twist network. The latter has an impedance which can practically be neglected at the pilot frequency but which rises to about another 200 ohms at zero frequency. Accordingly, at the high frequency end of the scale, the impedance of the variable arm varies between about 320 ohms, which is very nearly a balance with the adjacent arm, and about 600 ohms, which is widely out of balance. The variation in output voltage at this frequency therefore corresponds to a change in signal level of over 20 decibels, and this can be greatly increased by only a slight increase in the value of resistor 19; if the latter were raised to 320 ohms the bridge could be completely balanced and the attenuation at the pilot frequency be made infinite. At the zero end of the scale the possible change in output between hot and cold conditions of the thermosensitive element is only in the neighborhood of 2 db. The bridge circuit therefore meets the requirement that at and near the pilot frequency bridge balance is determined almost entirely by the thermo-sensitive resistance element, whereas frequencies remote from the pilot frequency the equalizing network is the dominant factor and the thermal element has little effect upon the balance of the bridge.

It is not good practice to operate the lamp filaments to the extreme limits of their temperature range; in the present instance a variation in resistance between 230 ohms and 1285 ohms has been found to give the necessary correction in one device tested, leaving ample margin to take care of the inevitable differences in the circuit components. In this case the D.-C. bias current varies between 1 ma. and 20 ma., and the control grid voltage bias between −10 and −22 volts.

The final level correction of about 8 db. is applied through variation in the load resistor 43. The output circuit 37 will usually feed directly the grid-cathode circuit of an amplifier, in which case the lamp 43 becomes the only appreciable load on the bridge circuit. Looking back into the bridge from the load the impedance is approximately 300 ohms, and if the lamp 43 were connected directly across the primary portion only of winding 33 the total variation in voltage due to its change in resistance would be less than 6 db, and the loss would not vary in proportion to the bridge loss at the pilot frequency as is desired. By employing the auto-transformer connection at a turns ratio of 2:1 the effective impedance of the load, as reflected back to the bridge circuit is decreased by a factor of 4, and the loss introduced becomes very nearly in inverse ratio to the impedance, with a range of 10 db. By variation of turns ratio practically any desired relation between the loss in the load circuit and that in the bridge circuit can be attained. A ratio of 1.65:1 will give 8 db here required, with sufficient linearity.

Figure 7:
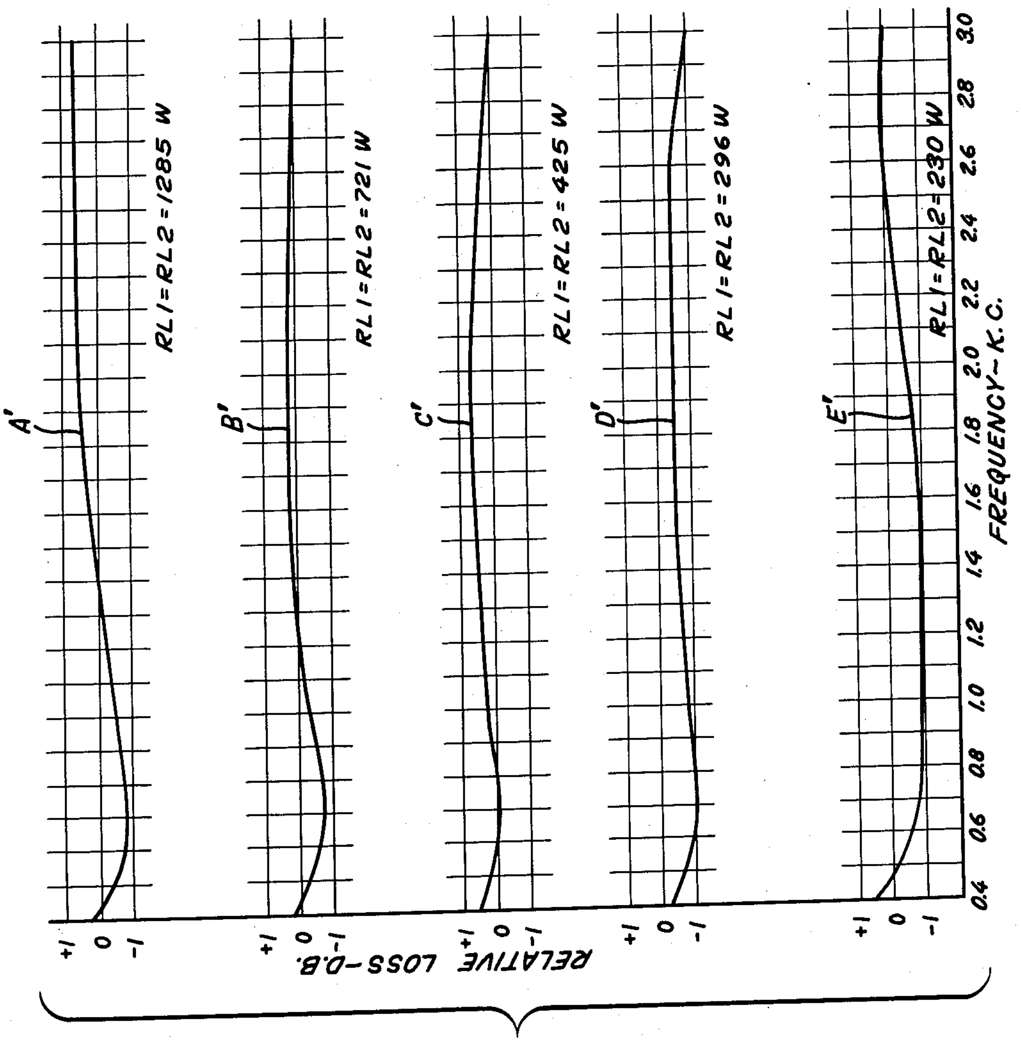
Fig. 7 is a group of curves illustrating the actual equalization of a line having the characteristics shown in the curves of Fig. 2, obtained with a regulator in accordance with this invention, all curves being referred to the same output reference level.

It should be noted that by series and parallel combinations of variable and fixed resistors, and by shunting more or less of the biasing current through the variable resistors (as, for example, by omitting the blocking condenser 20 in the bridge circuit) almost any desired curve can be matched. The results obtained in correcting the particular line characteristics illustrated in Fig. 2 are shown in the curves of Fig. 7 where the curves lettered consecutively from A′ to E′ show the regulated outputs of the device under the line conditions shown in the curves lettered correspondingly from A to E in Fig. 2. Each of the curves in Fig. 7 is referred to the same zero level. The maximum variation in level, with either frequency or line condition is materially less than 1 db plus or minus.

The simplest method of compensating for differing lengths of line is to patch into the circuit sections of artificial line having dry line transmission constants, although nearly as good regulation will be attained for moderate variations in length without this adjustment.

It is a fundamental of bridge circuits, considered as initially balanced, that the same degree of unbalance and the same difference of potential across the output diagonal as will be produced by multiplying the impedance of one arm only by a factor K will also be produced by multiplying the impedance of that same arm by the factor $1/K$, the potential across the input diagonal being held constant. The only difference between the two cases is a reversal of sign or phase in the output voltage. In the bridge circuit here considered such a reversal of phase is of no significance whatever.

It is also fundamental that, given any circuit having a known impedance characteristic, it is possible to derive, almost by inspection, a dual of such circuit, the impedance whereof varies as the reciprocal of the original. In deriving the dual circuit inductances are substituted for capacitances, parallel connections for series connections, and vice versa. A change of resistance in one sense, in the original circuit must be replaced by a change in the opposite sense in the dual.

A similar situation holds as regards the delivery of power into a load; the same degree of attenuation that is provided by a shunted auxiliary load having a given impedance ratio to the working load will be provided by a series impedance whose ratio to that of the working load is the reciprocal of the said given impedance.

Furthermore, the variable elements 17 and 43 may be made either to increase or decrease in resistance with increasing amplitude of the pilot frequency by merely reversing the polarity of the rectifier 49 and adjusting the bias on tube 55 to the proper value. By the same token, negative-coefficient thermistors may be substituted for the positive-coefficient lamps.

It follows that the regulator shown in Fig. 1 is illustrative of at least four modifications have identical characteristics; as shown, with either positive- or negative-coefficient variable elements, or its dual, also with either positive- or negative-coefficient elements. Beyond this lie further modifications; the circuit of the bridge may be as shown and that of the load the dual or vice versa, or a positive-coefficient element can be used for one variable element and a negative coefficient element for the other.

In view of the large number of permutations possible to provide circuits having identical characteristics with that shown and the well known principles by which such circuits may be derived, and further in view of the varying character of the communication circuits to which the regulator of this invention may be applied, it is believed that detailed description of such modifications would be not only unnecessary but confusing. It is therefore to be understood that the circuit discussed in detail herein is merely illustrative of the invention as defined in the following claims.

What is claimed is:

1. A pilot regulator for communication transmission lines comprising an input transformer having a tapped secondary winding, a substantially constant impedance element and an element the impedance whereof varies as a function of the current carried thereby connected respectively to the ends of said secondary winding to form a bridge circuit therewith, an inductive winding connected from the tap on said secondary winding to a point intermediate said impedance elements to form the output diagonal of said bridge circuit, a second element the impedance whereof varies with the current carried thereby connected to load said inductive winding, the connections between said windings being so arranged as to provide a single D. C. path through at least a part of each of said windings and said elements of varying impedance in series, and means for passing through said path a current varying as a function of the intensity of a signal in said inductive winding in such sense as to simultaneously increase the load on said inductive winding and bring said bridge circuit closer to balance with increase of said signal.

2. A plot regulator, for communication circuits carrying a band of frequencies including a pilot frequency, comprising a bridge circuit including input connections across one diagonal thereof, a ratio arm included in said bridge circuit comprising at least one inductive element and at least one capacitive element resonating substantially to said pilot frequency and a variable resistive element so connected to said inductive and capacitive elements as to cause a maximum change in impedance of said ratio arm through variation of said resistive element at said pilot frequency, the other arms of said bridge having substantially constant ratios, an output circuit connected across the other diagonal of said bridge circuit, a second variable resistive element connected in said output circuit to attenuate the energy delivered thereby, and means controlled by the amplitude of the pilot frequency in said output circuit to vary both of said resistive elements simultaneously in such sense as to bring said bridge circuit nearer to a balanced condition and increasingly attenuate the energy delivered to said output circuit upon increase in energy of said pilot frequency.

3. A regulator in accordance with claim 2 wherein said variable resistive elements comprise resistors having high temperature coefficients of resistance, and said pilot frequency controlled means comprises means for varying the temperature of said resistors.

4. A regulator in accordance with claim 2 wherein said variable resistive elements comprise resistors having a high temperature coefficient of resistance and said pilot frequency controlled means comprises means for passing through said resistors a direct current for heating the same.

5. A regulator in accordance with claim 2 wherein said variable resistive elements comprise resistors having a high temperature coefficient of resistance and said pilot frequency controlled means comprises a filter for selecting said pilot frequency from signals in said output circuit, means for developing a direct current the magnitude whereof is a function of the amplitude of said pilot frequency, and connections for supplying said direct current to said resistors.

6. A regulator in accordance with claim 2 wherein said variable resistive elements comprise resistors having a high temperature coefficient of resistance and said pilot frequency controlled means comprises an amplifier and a filter connected to derive an amplified signal of pilot frequency from said output circuit, a rectifier fed by said amplified signal to derive therefrom a direct potential varying with the amplitude of said pilot frequency, an amplifier and a direct current source connected thereto, connections for applying said direct potential to bias said amplifier thereby to control the direct current from said source passed thereby, and connections from said amplifier and said source to said resistors for applying said direct current thereto as a heating current.

7. A pilot regulator, for communication systems carrying a band of frequencies including a pilot frequency, comprising a bridge circuit having input connections across one diagonal thereof, a frequency-selective network of fixed elements having a minimum impedance for frequencies adjacent said pilot frequency and increasingly higher impedance for frequencies within said band more remote from said pilot frequency connected in one arm of said bridge circuit a variable-resistance element connected to said frequency-selective network in said arm, the other arms of said bridge having substantially constant impedance ratios, an output circuit connected across the other diagonal of said bridge, a second variable resistance element effectively connected across said output circuit, and means for varying the impedance of both of said variable resistance elements simultaneously in response to variations of amplitude of said pilot frequency in said output circuit.

References Cited in the file of this patent

UNITED STATES PATENTS

| | | |
|---|---|---|
| 1,834,005 | Roberts | Dec. 1, 1931 |
| 2,000,116 | Wright | May 7, 1935 |
| 2,182,329 | Wheeler | Dec. 5, 1939 |
| 2,258,128 | Black | Oct. 7, 1941 |
| 2,280,293 | Kreer | Apr. 21, 1942 |
| 2,462,551 | Renner | Feb. 22, 1949 |
| 2,501,263 | Cherry et al. | Mar. 21, 1950 |

FOREIGN PATENTS

| | | |
|---|---|---|
| 651,056 | Germany | Oct. 6, 1937 |